United States Patent
Barther et al.

(10) Patent No.: US 11,470,776 B2
(45) Date of Patent: Oct. 18, 2022

(54) AGRICULTURAL WORK MACHINE

(71) Applicant: CLAAS Selbstfahrende Erntemaschinen GmbH, Harsewinkel (DE)

(72) Inventors: Marvin Barther, Hoevelhof (DE); Dennis Neitemeier, Lippetal (DE); Frédéric Fischer, Arnsberg (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 612 days.

(21) Appl. No.: 16/534,242

(22) Filed: Aug. 7, 2019

(65) Prior Publication Data
US 2020/0068804 A1 Mar. 5, 2020

(30) Foreign Application Priority Data
Aug. 29, 2018 (DE) .......................... 102018121031.0

(51) Int. Cl.
*G06F 7/70* (2006.01)
*A01D 41/127* (2006.01)
(Continued)

(52) U.S. Cl.
CPC ....... *A01D 41/1271* (2013.01); *A01D 41/141* (2013.01); *G06T 7/248* (2017.01);
(Continued)

(58) Field of Classification Search
CPC .. A01D 41/1271; A01D 41/141; G06T 7/248; G06T 7/74; G06T 2207/30188;
(Continued)

(56) References Cited

U.S. PATENT DOCUMENTS 6,760,654 B2 * 7/2004 Beck .................... A01B 79/005
701/50
10,091,932 B2 10/2018 Neitemeier et al.
(Continued)

FOREIGN PATENT DOCUMENTS

| DE | 102016202628 A1 | 8/2017 |
|---|---|---|
| EP | 3 300 019 A1 | 3/2018 |
| EP | 3552474 A1 | 10/2019 |

OTHER PUBLICATIONS

European Search Report dated Jan. 28, 2020 issued in the corresponding application EP 19 17 8626 (with English translation of relevant parts).

*Primary Examiner* — Shardul D Patel
(74) *Attorney, Agent, or Firm* — Collard & Roe, P.C.

(57) ABSTRACT

An agricultural work machine, in particular a harvester, has a header for performing agricultural work and having a control device which has at least one sensor unit for detecting a crop stream in and/or around the header and an image processing unit for processing images which are generated by the sensor unit based on the crop stream detected via sensor. The control device is configured to detect regions of like characteristics, components of the header and properties of the crop stream and is configured to use that which has been detected for open loop control and/or closed loop control of process sequences in the agricultural work machine.

21 Claims, 4 Drawing Sheets

(51) Int. Cl.
  *A01D 41/14* (2006.01)
  *G06T 7/73* (2017.01)
  *G06T 7/246* (2017.01)
  *G06V 10/75* (2022.01)
  *G06V 20/56* (2022.01)

(52) U.S. Cl.
  CPC .............. *G06T 7/74* (2017.01); *G06V 10/751* (2022.01); *G06V 20/56* (2022.01); *G06T 2207/30188* (2013.01); *G06T 2207/30252* (2013.01)

(58) Field of Classification Search
  CPC ........ G06T 2207/30252; G06V 10/751; G06V 20/56; G06F 7/70
  USPC .......................................................... 701/50
  See application file for complete search history.

(56) References Cited

U.S. PATENT DOCUMENTS

| | | | | |
|---|---|---|---|---|
| 10,537,062 | B2 * | 1/2020 | Brubaker | G05D 1/0094 |
| 2005/0059445 | A1 * | 3/2005 | Niermann | A01D 41/1243 460/112 |
| 2016/0088794 | A1 * | 3/2016 | Baumgarten | A01D 41/1243 460/1 |
| 2016/0192587 | A1 * | 7/2016 | Ballegeer | A01D 41/1243 460/111 |
| 2018/0084718 | A1 * | 3/2018 | Baumgarten | A01D 41/1243 |
| 2018/0084719 | A1 * | 3/2018 | Neitemeier | G01F 1/05 |
| 2018/0242523 | A1 * | 8/2018 | Kirchbeck | G01N 21/3563 |
| 2019/0307070 | A1 * | 10/2019 | Dima | A01D 41/141 |

\* cited by examiner

AGRICULTURAL WORK MACHINE

CROSS REFERENCE TO RELATED APPLICATIONS

This application claims priority under 35 USC 119 of German Application No. DE 102018121031.0 filed on Aug. 29, 2018, the disclosure of which is herein incorporated by reference.

BACKGROUND OF THE INVENTION

The invention is directed to an agricultural work machine and to a method for operating an agricultural work machine.

Agricultural work machines which include, in particular, self-propelled harvesters such as combine harvesters and chopper-type forage harvesters generally have, as a header, a crop collection arrangement by which crops in the field stand can be cut and collected for further processing in the combine harvester. A crop collection arrangement in itself generally has a plurality of individual components which can be operated with different parameters. Examples of such components in a combine harvester are a crop pickup device in the form of a reel, a crop cutting device in the form of a cutting unit table with a knife bar, a crop conveying device in the form of a conveyor screw, in particular a cross auger, and a crop intake device in the form of an inclined conveyor. In a combine harvester, the placement (cut height, position) and rate of rotation of the reel and the speed of the cross auger and of the inclined conveyor, for example, can be adjusted. The crop stream inside the crop collection arrangement can be influenced in this way. The driving speed of the harvester further influences the crop stream inside of the crop collection arrangement because the amount of collected crop which is processed by the crop collection arrangement is influenced in this way.

Despite a number of automatic adjustments of the crop collection arrangement, the driver of the agricultural work machine must constantly monitor the crop stream inside of the crop collection arrangement as well as inside of the combine harvester. For example, the driver must ensure that the produce flow velocity inside of the header and in the rest of the interior of the combine harvester is as uniform as possible because when the produce flow is irregular the speed of the vehicle and, therefore, collection of crops may have to be reduced in order to avoid a crop jam. If a crop jam occurs, the harvesting process must be interrupted and a time-consuming clearing of the crop jam must be performed in the header and, further, in the combine harvester. The time required for this significantly impairs the efficiency of the harvesting operation.

Therefore, it is desired that an open loop control and/or closed loop control of the process sequences in the agricultural work machine, for example, in the combine harvester, is automated as far as possible so as to relieve the burden from the driver. This requires an analysis of the process sequences which is as differentiated as possible beginning with the process sequences inside of the header. For an optimal analysis, it is necessary to monitor the crop stream in an optimal manner and to detect changes in the crop stream, particularly the produce velocity, as promptly as possible and to carry out corresponding control steps.

To this end, it is known, for example, from EP 3 300 019 A1, to provide a control device with a sensor unit and an image processing unit via which the crop stream is monitored using the method of optical flow. The sensor device has, for example, two cameras which are directed from the driver's cab onto the crop collection arrangement and which encompass individual portions of the components and the crop stream. The sensor device generates an image sequence, i.e., a plurality of consecutive images. According to the prior art, every two consecutive images are grouped to form an image pair, and positional displacements of intensity patterns, that is, of pixels or groups of pixels, between the images of the respective image pair are determined. The intensity patterns are not necessarily formed by objects or particular crop features but generally by pixels or groups of pixels in the image whose position changes from one image to the next image. When the time interval between the images of the image pair is known, the velocity at which the intensity patterns travel can be inferred from these positional displacements of the intensity patterns. The velocities of a plurality of intensity patterns can be combined for each image pair and each image sequence comprising a plurality of image pairs to form velocity characteristic maps. A velocity characteristic map of this kind relates to optical flow. With regard to the method of optical flow and its application for monitoring the crop stream inside of a header, reference is made to EP 3 300 019 A1 which originated with the Applicant and the disclosure of which is incorporated by reference into this application.

One challenge consists in considering and analyzing the crop stream in the most differentiated manner possible in order to respond to an incipient crop jam in a timely manner.

The problem upon which the invention is based is to configure and further develop an agricultural work machine in such a way that the monitoring of a header is further improved with respect to accuracy, reliability and timeliness.

SUMMARY OF THE INVENTION

The above-stated problem is solved in an agricultural work machine such as a harvester, having a header for performing agricultural work and having a control device which has at least one sensor unit for detecting a crop stream in and/or around the header and an image processing unit for processing images which are generated by the sensor unit based on the crop stream detected via sensor. The control device is configured to detect regions of like characteristics, components of the header and properties of the crop stream and is configured to use that which has been detected for open loop control and/or closed loop control of process sequences in the agricultural work machine.

A key basic consideration consists in detecting the header, in particular a crop collection arrangement of a combine harvester or chopper-type forage harvester, using sensors such that individual areas in the header and around the header can be detected, i.e., identified. The areas are, for one, regions of like characteristics. A region of like characteristics is, for example, the unharvested field stand in front of the header in driving direction. A further region of like characteristics is, for example, the harvested field stand (stubble field) behind the header.

Regions of like characteristics may also include produce flow regions of like characteristics. For example, a region of like characteristics is formed by the crop stream within the crop pickup device, in particular the reel, and another region of like characteristics is formed by the crop stream vertically above the crop cutting device, particularly vertically above the cutter unit table, in particular in the area between the crop pickup device or reel and the crop conveying device, in particular the conveyer screw.

Apart from these areas which are characterized by the presence of mainly biomass (crop, field stand) within the area, further areas are components of the header having a surface portion of a machine part of the component, which surface portion can be detected by the sensor unit. Corresponding components are, for example, the crop pickup device, particularly the reel, the crop cutting device, particularly the cutter unit table, the crop conveying device, particularly the conveyer screw, and/or the crop intake device, particularly the inclined conveyor, of a crop collection arrangement, for example, of a combine harvester. Accordingly, each of these areas is defined by the presence of a surface portion of a machine part of a component of the header.

In addition to these areas, it is suggested that a detection of properties of the crop stream, for example, produce flow velocities of the crop stream or portions thereof and/or a crop jam, is carried out.

On the basis of the information gathered in an analysis process of this type, process sequences in the agricultural work machine are then controlled according to the suggestion in a subsequent or simultaneously running open loop control process and/or closed loop control process. As a result of dividing into regions and components, the behavior of a header and of the crop stream guided along therein can be considered and analyzed in a particularly differentiated manner. Correspondingly, the monitoring of a header, in particular a crop collection arrangement, is further improved with respect to accuracy, reliability and timeliness.

It is provided according to the suggestion that the control device is configured to detect regions of like characteristics, components of the header and properties of the crop stream and is configured to use that which has been detected, i.e., the detected regions of like characteristics, the detected components of the header and/or the detected properties of the crop stream, for open loop control and/or closed loop control of process sequences in the agricultural work machine.

"Detection" of the above-mentioned regions and components preferably does not simply mean a determination of areas but also an unambiguous identification of the respective area, that is, an association of the area with a function and/or property. Accordingly, for example, detection of the region with the field stand in front of the header means that an area is first detected or located by sensor detection and image processing and this area is then identified as a specific area with a particular function and/or property, for example, specifically as field stand in front of the header. Therefore, the individual areas can be distinguished from one another not only based on their position but also based on their function and/or property. This makes it possible to differentiate determined motions.

In one embodiment, an identification is possible based on stored identification data characterizing the respective area (region or component). For example, determined dimensions or positions of a region or component inside of the header or outside of the header can be stored in a data storage as identification data, and the region or component can then be identified as a determined region or component on the basis of these identification data.

In order to allow the determination of regions and/or components and/or produce stream properties, the image processing unit can use various methods based on the images generated by the sensor unit. For example, the image processing unit can use the method of velocity characteristic map determination, also known as optical flow method, which will be explained in more detail later. Additionally or alternatively, it can use the method of line detection which will also be explained later. Additionally or alternatively, it can also use at least one color filter. In this way, an object detection in which, in particular, biomass is distinguished from mechanical objects can also be carried out.

A velocity characteristic map determination, or optical flow method, is an image processing method, know per se, and is based on the determination and analysis of intensity patterns (pixels or pixel groups) in consecutive images of an image sequence. Accordingly, an image sequence, i.e., a plurality of consecutive images, is generated particularly via one or more cameras. Every two consecutive images, in particular two directly successive images, of the image sequence are grouped to form an image pair, and positional displacements of intensity patterns, i.e., of pixels or groups of pixels, between the images of the respective image pair are determined. When the time interval between the images of the image pair is known, the velocity at which the intensity patterns travel can be inferred from these positional displacements of the intensity patterns. The direction in which the intensity patterns travel can also be determined from the positional displacements. The optical flow method accordingly comprises the pixel-based generation of information on velocities of intensity patterns on the one hand and on the movement directions of these intensity patterns on the other hand. The velocities of a plurality of intensity patterns can be combined for each image pair and each image sequence comprising a plurality of image pairs to form velocity characteristic maps, which can also be referred to broadly as optical flow.

Since the biomass on the one hand and the surface portions of the mechanical components of the header on the other hand move, respectively, in a characteristic manner, the image processing unit can also distinguish the individual areas from one another.

A method of line detection can be used additionally or alternatively. This is an image processing method in which an edge detection is initially carried out for the respective image and an edge image is generated therefrom. In an edge detection, two-dimensional areas in a digital image are separated from one another when they differ from one another sufficiently with respect to color value or grayscale value, brightness or texture along straight or curved lines. An edge detection of this kind and generation of an edge image are carried out in particular by means of the Canny algorithm, known per se. In the method of line detection, according to the suggestion, straight lines are subsequently determined and displayed or highlighted in the edge image by means of a straight line detection. A straight line detection of this kind is preferably carried out by means of the Hough transform, known per se. Contours of components or of machine parts thereof can be detected by means of the line detection, which likewise allows individual areas (regions or components) to be distinguished from one another and possibly also identified. In this way, in a digital image showing, for example, a crop collection arrangement of a combine harvester, the reel in particular can be emphasized and accordingly identified because it is shown by many straight lines in a two-dimensional image. Also, apart from the detection of the respective component, it is possible to determine geometric parameters of the respective component, for example, the inclination and/or height of the component.

When image pairs of consecutive images of an image sequence generated by the sensor unit are processed using line detection, image line patterns, namely, patterns of the straight line or lines determined by means of straight line detection, result in every image. In a corresponding image pair, positional displacements of line patterns, that is, of lines or line groups, between the images of the respective image pair can then be determined similarly as in the method of velocity characteristic map determination. When the time interval between the images of the image pair is known, the velocity at which the line patterns travel can also be inferred from these positional displacements of line patterns. In principle, the direction in which the line patterns move can also be determined. That is, the line detection comprises line-based generation of information on velocities of line patterns and possibly also on movement directions of the latter. Therefore, in addition to the detection of the areas, it is also possible to determine the velocity at which lines or contours of components move between two consecutive images.

The method of the invention also includes determining reference regions or reference surface portions with which another region to be analyzed currently can be compared. A comparison of this type between two regions, one of which serves as basis (reference), makes it possible to infer properties, particularly the velocity, in the region to be currently analyzed. This holds true not only for regions but also for components and surface portions thereof. In a particularly preferred manner, there is the possibility of determining a reference velocity for a reference region. The reference velocity can be determined, for example, by relating the driving speed of the agricultural work machine, which is known or can be accurately detected by appropriate sensors, to a velocity of the field stand of a region, which velocity is calculated from the displacement amounts. The reference velocity is a velocity corresponding to the driving speed in a determined ratio. This is also correspondingly possible for velocities of surface portions of machine parts of the components. In this case, for example, the rate of rotation of a component, for example, the reel, which is known or can be accurately detected by appropriate sensors, can be correlated to the velocity of the surface portion calculated from the displacement amounts. The reference velocity is then a velocity corresponding to the rate of rotation in a determined ratio. Velocities in other regions or of other surface portions of components can then also be inferred based on reference velocities of this kind.

According to one embodiment, the header is a crop collection arrangement for cutting and picking up crop from a field stand which has, as components, a crop pickup device, a crop cutting device, a crop conveying device and a crop intake device. In particular, it is a crop collection arrangement of a combine harvester or chopper-type forage harvester.

In the further configuration, the velocity of a surface portion of a machine part of the respective component can also be determined on the basis of a marker which then forms the surface portion. Either a characteristic location, for example, edge or surface area, on the respective machine part or a separately applied marking serves as marker. The marker then shows the surface portion that is detected by the sensor unit for determining the velocity.

In a preferred configuration, different sensors for detecting the crop stream and/or header can be provided, in particular at least one optical sensor, for example, a camera or a plurality of cameras. An optical sensor of this kind is useful particularly when the method of velocity characteristic map determination (optical flow method) is to be used. In principle, the sensor unit can also have at least one Lidar sensor, at least one radar sensor and/or at least one ultrasound sensor. All of the sensors mentioned above are also suitable for use with the method of line detection.

According to a further teaching a method is claimed for the operation of an agricultural work machine, in particular an agricultural work machine as suggested above, in which regions of like characteristics, components of the header and properties of the crop stream are detected, and process sequences in the agricultural work machine which are based on the latter are controlled by open loop controlling and/or closed loop controlling.

BRIEF DESCRIPTION OF THE DRAWINGS

The invention will be described in more detail in the following referring to drawings in which only one embodiment example is depicted. The drawings show:

FIG. 3 a schematic view a) of an image with the header that is generated by the sensor unit of the suggested agricultural work machine, and b) of the image after processing by the image processing unit by means of a first image processing method; and FIG. 4 a schematic view of an image generated by the sensor unit of the suggested agricultural work machine with the header a) after a first processing step of a second image processing method and b) after a second processing step of the second image processing method.

DETAILED DESCRIPTION OF THE EMBODIMENTS

Figure 1:
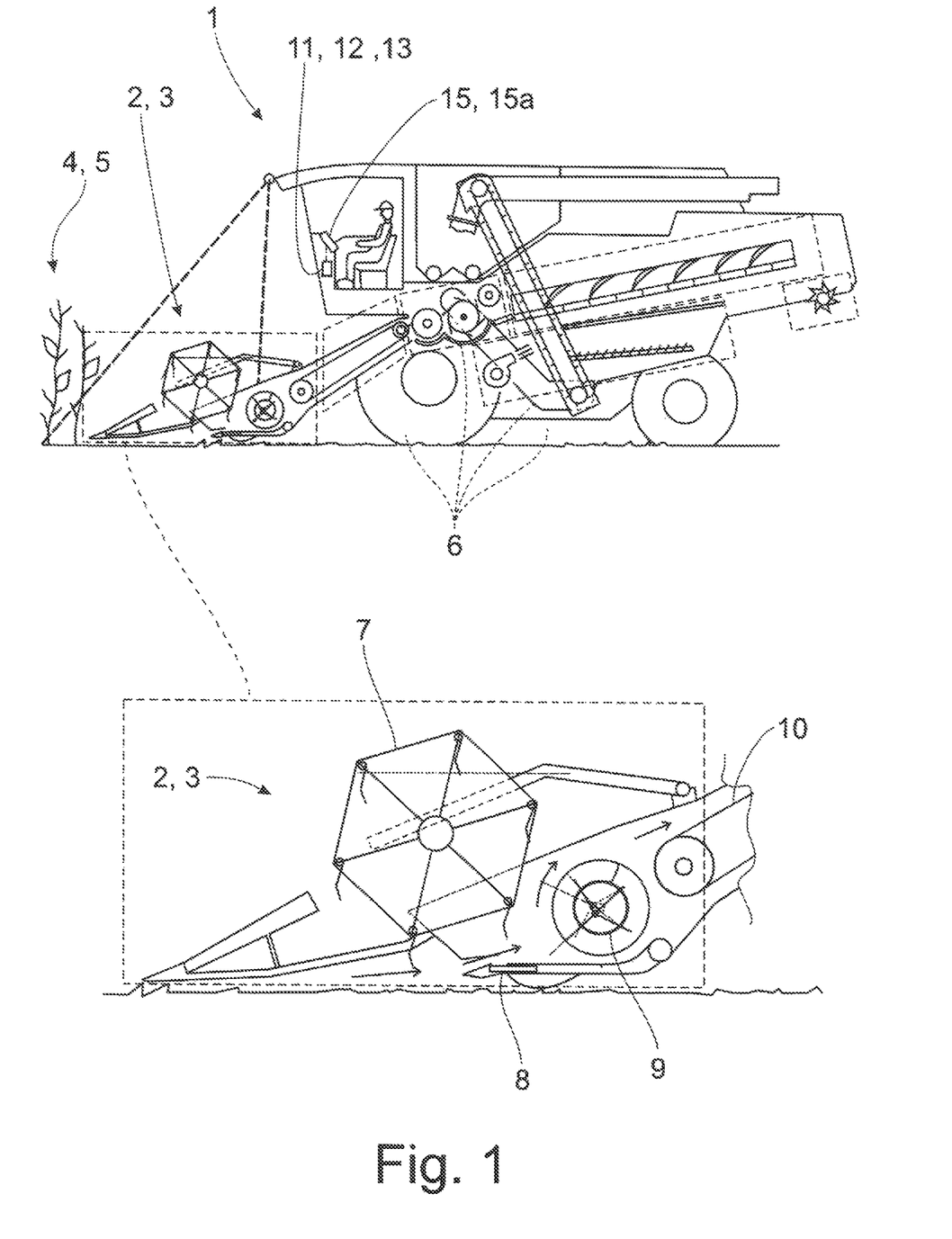
FIG. 1 a schematic side view of a suggested agricultural work machine and a detailed view of the header of the agricultural work machine.

The suggested agricultural work machine 1 which in this case is a combine harvester, for example, has as header 2 a crop collection arrangement which is formed in this case by a cutting unit 3 and is arranged in front of the agricultural work machine 1 in driving direction. The crop collection arrangement 2 and cutting unit 3 serve respectively to cut and collect crop 4 from a field stand 5, and the crop 4 is supplied for further processing by a plurality of further work elements 6 of the agricultural work machine 1. The further comments with regard to the example of the crop collection arrangement 2 are not limited to this case of application but also apply in a corresponding sense for other headers 2, for example, a crop header of a chopper-type forage harvester.

In this instance and preferably, the crop collection arrangement 2 has in every case as components C, D, E, F a crop pickup device 7 in the form of a reel, a crop cutting device 8 in the form of a cutting unit table with a knife bar, a crop conveying device 9 in the form of a conveyor screw, in particular a cross auger, arranged downstream thereof with respect to the process, and a crop intake device 10 in the form of an inclined conveyor which is again arranged downstream thereof with respect to the process.

In the suggested agricultural work machine 1, the crop 4 is guided as crop stream (indicated by arrows in FIGS. 1 and 3a)) through the crop collection arrangement 2. In this instance and preferably, the crop 4 is collected and held via the crop pickup device 7 or reel while it is being cut by the crop cutting device 8. The cut crop 4 is then moved toward the crop conveying device 9 which, in this instance and preferably, extends transversely and is conveyed from the latter in transverse direction, i.e., transverse to driving direction, toward the center of the vehicle where it is then taken in by the crop intake device 10 and conveyed further into the interior of the agricultural work machine 1.

Figure 2:
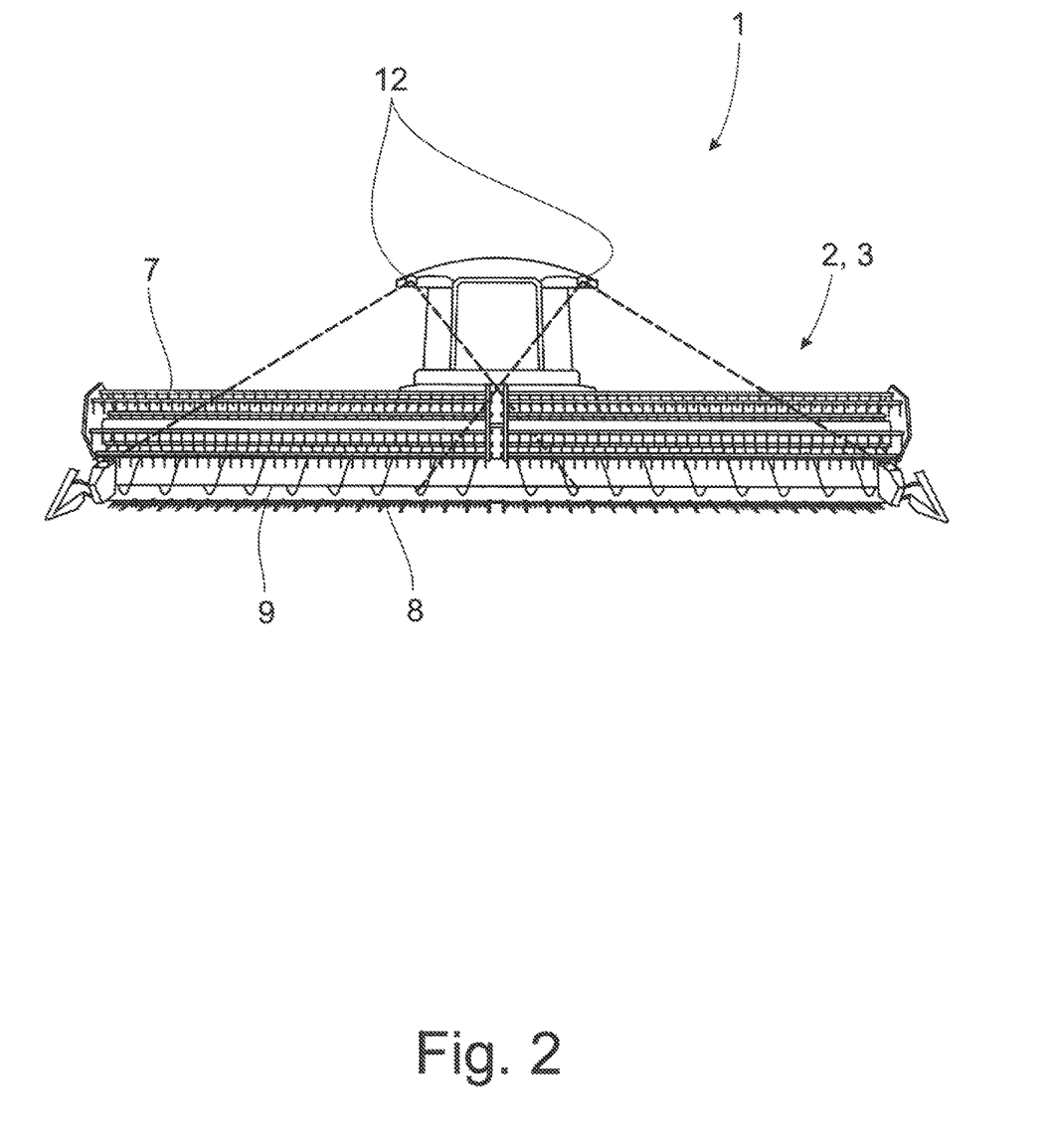
FIG. 2 a schematic front view of the suggested agricultural work machine with the header.

The agricultural work machine 1 further has a control device 11 which, in addition to the above-mentioned components C, D, E, F of the crop collection arrangement 2, also serves in this instance and preferably to control the further work elements 6 of the agricultural work machine 1. The controlling can include speed controls and/or height adjustments and/or position adjustments. Also, in this instance and preferably, the driving speed of the agricultural work machine 1 is controlled via the control device 11. In this instance and preferably, control device 11 has a sensor unit 12 in the form of two cameras. Sensor unit 12 is arranged in the front area of the agricultural work machine 1, particularly on and/or inside of the driver's cab of the agricultural work machine 1, and serves for optical detection of the crop stream. The range of optical detection is represented by dashed lines in FIGS. 1 and 2.

Figure 3:
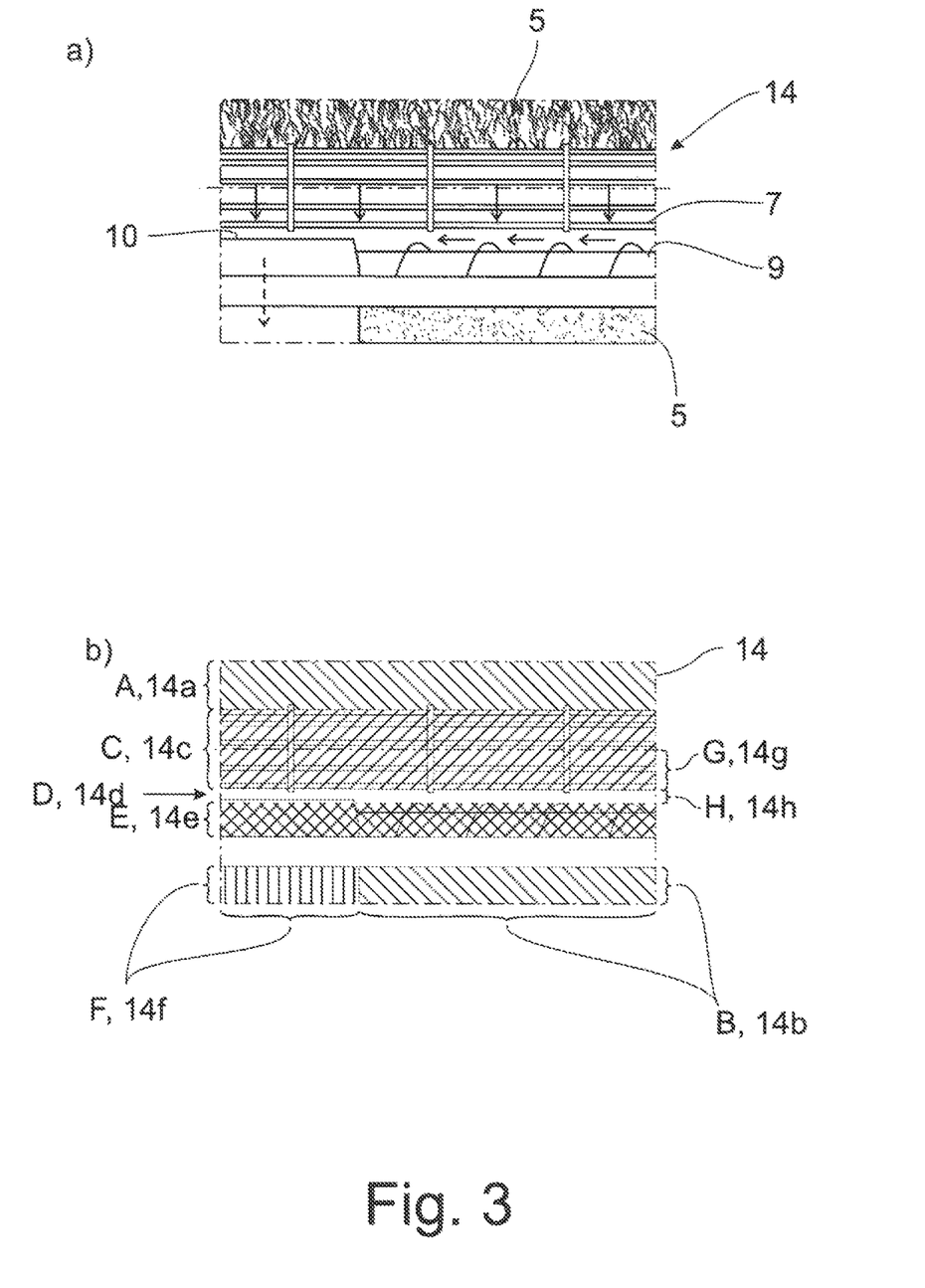

Further, the control device 11 has an image processing unit 13 for processing images 14, one of which is shown by way of example in FIG. 3*a*). Images 14 are generated by the sensor unit 12 based on the optically detected crop stream.

Further, in this instance and preferably, the control device 11 has a data output unit 15 which in particular comprises a display device 15*a* and serves for optional output or display of the images 14 processed by the image processing unit 13.

It is key, for one, that the control device 11 is configured to detect regions A, B, G, H of like characteristics, components C, D, E, F of the header 2 or, in this case, of the crop collection arrangement and properties of the crop stream. The regions A, B, G, H of like characteristics on the one hand and components C, D, E, F of header 2 on the other hand constitute areas in and around the header 2 which are detectable by the sensor unit 12 and which are particularly suitable as basis for a differentiated consideration and analysis of the crop stream.

In the preferred embodiment example of the unharvested field stand 5 shown in the drawing, a region A of like characteristics is in front of the crop collection arrangement 2 with respect to driving direction. In this instance, a further region B of like characteristics is the harvested field stand 5 in the form of the stubble field behind the crop collection arrangement 2. Yet another region G of like characteristics is formed by the crop stream within the crop pickup device 7 in the form of the reel. Finally, yet another region H of like characteristics in the embodiment example is formed by the crop stream vertically above the crop cutting device 8 in the form of the cutting unit table, in this case in the area between the reel and the crop conveying device 9 in the form of the conveyor screw. All of these regions are characterized in that biomass flows past them (in the form of the field stand while driving) or biomass flows through them (in the form of the crop stream).

In addition to these areas which are characterized by the presence of mainly biomass (crop, field stand) within the area, further areas are formed by components C, D, E, F of the crop collection arrangement 2 in the present embodiment example. These areas have in each instance at least one surface portion of a machine part of the respective component C, D, E, F, which surface portion can be detected by the sensor unit 12. Corresponding components C, D, E, F are, in this case, the crop pickup device 7 in the form of the reel, crop cutting device 8 in the form of the cutting unit table, crop conveying device 9 in the form of the conveyer screw and crop intake device 10 in the form of the inclined conveyer. The list of suggested components is not meant to be conclusive. On the contrary, many other components which can likewise be detected by sensors are conceivable, for example, also steps, frame parts or the like. Accordingly, each of these areas is defined by the presence of a surface portion of a machine part of a component C, D, E, F of the crop collection arrangement 2.

Further, the control device 11 carries out the detection of properties of the crop stream, for example, of produce flow velocities of the crop stream or portions thereof, and/or a crop jam particularly via the image processing unit 13.

Further, it is also key that the control device 11 uses that which is detected, i.e., the detected regions and components A-H and the detected properties of the crop stream, for the open loop control and/or closed loop control of process sequences in the agricultural work machine 1. On this basis, parameters of components C, D, E, F of crop collection arrangement 2 and/or parameters of further working elements 6 of the agricultural work machine 1, in the present instance, the combine harvester, can be adapted. Because of the division into regions and components A-H, the crop collection arrangement 2 and the crop stream can be considered and analyzed in a very differentiated manner, which in turn optimizes the crop collection arrangement 2 and the crop stream.

In the embodiment example shown here, the regions and components A-H are first detected or determined. Subsequently, at least some of the regions and components A-H are specifically identified in that each of these areas is compared preferably with associated identification data (e.g., dimensions, positions, etc.) which characterize these areas and which are stored particularly in the image processing unit 13. For example, the field stand 5 in front of the crop collection arrangement 2 can be determined as a region A and then also particularly identified as such, that is, as the field stand 5 in front of the crop arrangement 2. Correspondingly, the field stand 5 behind the crop collection arrangement 2, for example, can be determined as a region B and then identified in particular specifically as the field stand 5 behind the crop collection arrangement 2. In principle, this is also possible for components. Accordingly, it is conceivable, for example, to determine the crop pickup device 7 or reel as a component C and then to specifically identify it as such, that is, as crop pickup device 7 or reel, or the crop cutting device 8 or cutting unit table can be determined as a component D and identified in particular as such. Other examples are also conceivable.

The determination of the regions and components A-H is carried out by means of the image processing unit 13, namely, by determining associated image areas 14*a*-14*h* in the images 14 generated by the sensor unit 12 as will be explained in more detail later. To this end, different image processing methods can be used individually or in combination. Two particularly preferred methods, namely, the method of velocity characteristic map determination and the method of line detection, are described in more detail in the following. In principle, these methods can also be combined with other methods for optimizing image data, for example, by using at least one color filter, noise suppression, a contrast change, a change in brightness, or the like. An object detection which preferably comprises distinguishing biomass on the one hand and mechanical objects on the other hand and/or distinguishing one or more regions A, B, G, H on the one hand and one or more surface portions of machine parts of components C, D, E, F on the other hand can then be carried out by means of these methods.

The image processing unit 13 in the suggested agricultural work machine 1 can produce a velocity characteristic map, also known as optical flow, based on the images 14 generated by the sensor unit 12, in this instance and preferably by one or more cameras. The optical flow is the pixel movement in the image area, also known as the flow field, determined by an image frequency. The image frequency is in turn defined by the pixel position and the time. The movement is a vector field in an image 14 that is generated by superimposing two images 14 of an image pair and describes the time-dependent displacement of a pixel or of a group of pixels, also referred to hereinafter as intensity pattern, from one image 14 to the next image 14 of the image pair. The image which is composed of the two individual images 14 can be reworked beforehand through the image processing unit 13 as is described in detail, for example, in EP 3 300 019 A1. The Lucas-Kanade method, in which the image resolution of the images is reduced, is mentioned here merely by way of example. The resulting image is then used to produce the velocity characteristic map.

In this instance, the velocity characteristic map has, for one, the produce flow velocities, particularly of crop particles, and velocities of surface portions of machine parts of components C, D, E, F of the crop collection arrangement 2.

To produce the velocity characteristic map, the image processing unit 13 groups two consecutive images 14 in each instance, in particular two directly successive images 14, of an image sequence generated by the sensor unit 12 to form an image pair. A time interval between the images 14 of the respective image pair is detected by the image processing unit 13. Additionally or alternatively, a time interval can be predetermined by the image processing unit 13. Each image 14 of the respective image pair has an intensity pattern, i.e., a pixel or a group of pixels. The image processing unit 13 determines positional displacements of the intensity patterns between the images 14 of the respective image pair, which positional displacements include displacement amounts and displacement directions. In this instance and preferably, the displacement amounts and displacement directions for each image pair are combined as vectors of a vector field of the respective image pair.

Velocities are then calculated by the image processing unit 13 from the displacement amounts of the intensity patterns between the images 14 of the respective image pair and the time interval between the images 14 of the respective image pair. As has already been indicated, the velocities are produce flow velocities and/or velocities of surface portions of components C, D, E, F of the crop collection arrangement 2. The respective velocity of a surface portion of a machine part of the respective component C, D, E, F can also be determined based on a marker which then forms the surface portion that is detected via sensor for determining the velocity of the surface portion of this component C, D, E, F.

A comparison of the velocities or displacement amounts and displacement directions determined in the above-described manner makes it possible on the one hand to divide into individual areas, i.e., the individual regions and components A-H, for example, because the velocities or the displacement amounts and displacement directions differ in all of the regions and components A-H. An exemplary division is shown in FIG. 3*b*).

On the other hand, the above-mentioned detection of properties of the crop stream, for example, the detection of an incipient crop jam, can be carried out based on the determined velocities or displacement amounts and displacement directions.

As is shown in FIG. 3*b*), the images 14 generated by the sensor unit 12 are divided by the image processing unit 13 into image areas which correspond in each instance to one of the regions and components A-H mentioned above. As can be seen from FIGS. 3*a*) and 3*b*), the sensor unit 12 detects the field stand 5 in front of and behind the crop collection arrangement 2. In addition, in this instance and preferably, the crop pickup device 7, the crop cutting device 8, the crop conveying device 9 and the crop intake device 10 are detected by the sensor unit 12. The crop stream inside of the crop pickup device 7 and the crop stream vertically above the crop cutting device 8 are also detected, in this case between the crop pickup device 7 and the crop conveying device 9. In order to isolate the relevant areas with the crop stream, the depicted image areas in the images 14 are determined as has been described, in the present instance and preferably an image area 14*a* with the field stand 5 in front of the crop collection arrangement 2, an image area 14*b* with the field stand 5 behind the crop collection arrangement 2, an image area 14*c* with the crop pickup device 7, an image area 14*d* with the crop cutting device 8, an image area 14*e* with the crop conveying device 9, an image area 14*f* with the crop intake device 10, an image area 14*g* with the crop stream inside of the crop pickup device 7 and/or an image area 14*h* with the crop stream vertically above the crop cutting device 8, in particular in the area between the crop pickup device 7 and the crop conveying device 9.

Figure 4:
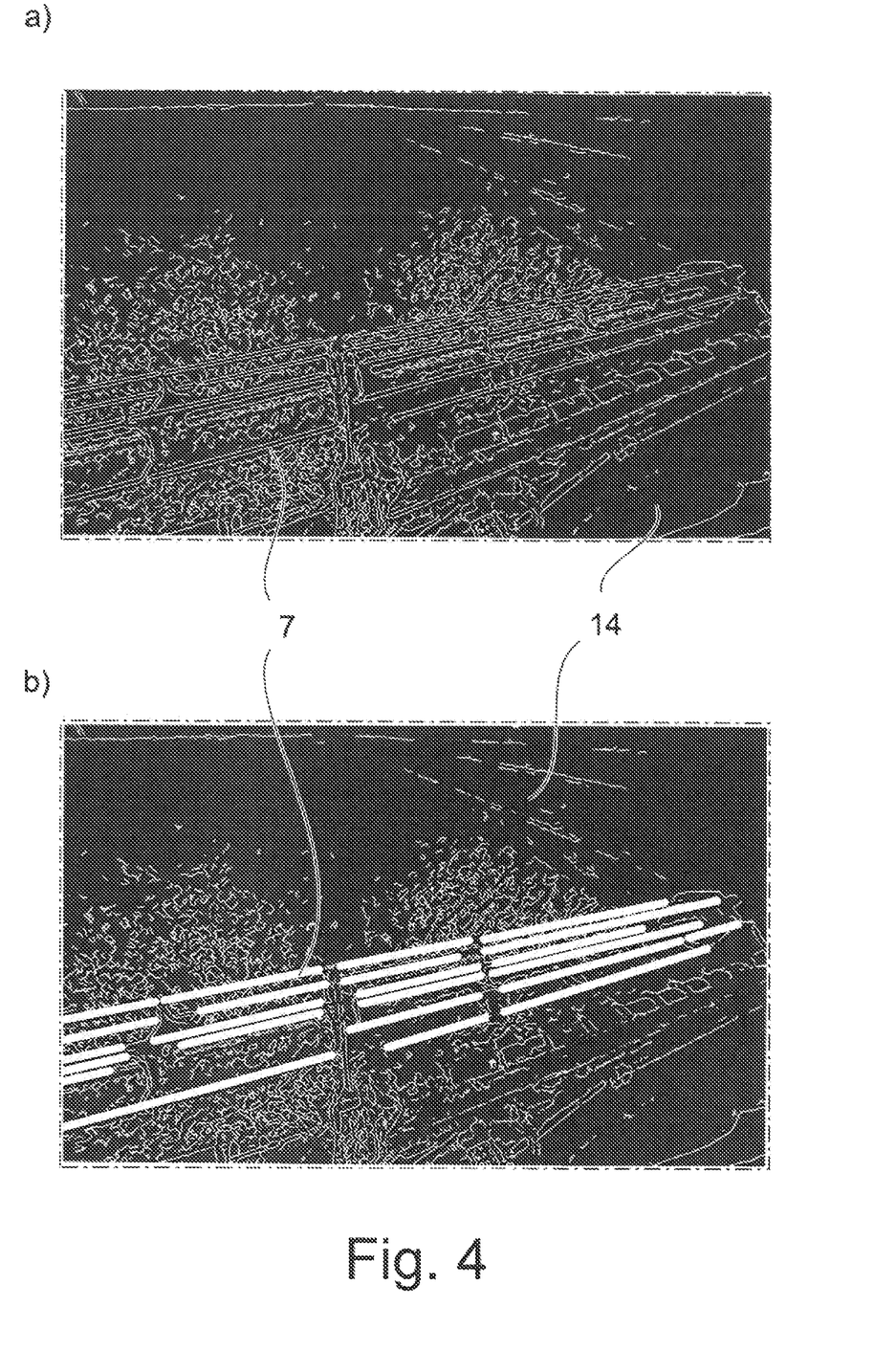

In principle, additionally or alternatively, individual image areas can also be determined and/or highlighted through the method of line detection, which is shown by way of example in FIG. 4 referring to the crop pickup device 7 in the form of the reel.

Accordingly, in the embodiment example shown here, a plurality of images 14 is also generated, in this case via the image processing unit 13 with the method of line detection by the sensor unit 12, in this case also by one or more cameras. Alternatively or additionally, the sensor unit 12 can have at least one Lidar sensor, radar sensor and/or ultrasound sensor for detecting the crop collection arrangement 2. Based on the images 14 generated in this way, an edge image is then initially generated for the respective image 14, in this instance and preferably by means of the Canny algorithm. Based on the latter, a straight line detection is then carried out in which straight lines are determined in the edge image, in this instance and preferably by means of the Hough transform and, as is shown in FIG. 4*b*), the straight lines can be graphically highlighted. The graphically highlighted lines in FIG. 4*b*) define one of the described components C, D, E, F to be detected, in this case the crop pickup device 7 in the form of the reel.

Similarly as with the method of velocity characteristic map determination, it is provided in the method of line detection in this instance and preferably that the image processing unit 13 groups two consecutive images 14, in particular two directly successive images 14, of an image sequence generated by the sensor unit 12 to form an image pair, and a time interval between the images 14 of the respective image pair is detected and/or predetermined by the image processing unit 13, and each image 14 of the respective image pair has a line pattern comprising one or more straight lines. The line pattern is a line or lines obtained through the above-described straight line detection. This line pattern is highlighted with brightness in FIG. 4*b*). In the present case, positional displacements of the line patterns between two images 14 of a respective image pair which include displacement amounts and particularly displacement directions of the line patterns can also be determined. These displacement amounts and displacement directions can also be combined for each image pair, respectively, as vectors of a vector field of the respective image pair.

It is then possible to calculate velocities, in this embodiment example the velocity of a surface portion of a machine part of the crop pickup device 7 in the form of the reel, from the displacement amounts of the line patterns between the images 14 of the respective image pair and the time interval between the images 14 of the respective image pair. If another component C, D, E, F is used instead of the reel as basis for the method of line detection, the velocities of the surface portions of the machine parts of this component C, D, E, F of the crop collection arrangement 2 can also be determined.

In addition to the detection of the respective component C, D, E, F, in this instance the reel, and the velocity behavior thereof, the method of line detection also allows geometric parameters of the respective component, for example, the inclination and/or height of the component, to be determined simply and quickly.

According to the suggestion, in a particularly preferred configuration it is also possible to analyze certain regions and components A-H from those mentioned above relative to one another for determining criteria and physical parameters.

To this end, the image processing unit 13 can specify one or more regions A, B, G, H in each instance as reference region and/or one or more surface portions of machine parts of components C, D, E, F in each instance as reference surface portion. The respective reference region and/or the respective reference surface portion can then be utilized as basis (reference) for a comparison with another region A, B, G, H and/or another reference surface portion.

The basic idea in this case is that the actual velocity is known or can be exactly determined, for example, via speed sensors, for particular regions or surface portions, and this velocity can be utilized to correct or to calibrate the velocities calculated on the basis of the image processing method (e.g., velocity characteristic map determination and/or line detection). Accordingly, the velocities calculated on the basis of the image processing methods are always also dependent on the header adjustments and machine adjustments as well as on environmental conditions and, therefore, generally vary in each case of use. However, if an actual velocity of a region A, B, G, H or of a surface portion of a component C, D, E, F is known, a value can also be determined by means of the latter for the velocity in other regions or surface portions.

For example, the rate of rotation of the reel is generally known so that there is also a value for the velocity of the associated surface portion of this component C fixed in the plane of the generated images 14. This velocity or this velocity value forms a reference velocity or a reference velocity value. Further, a velocity value of the associated surface portion has been calculated with reference to the above-mentioned displacement amounts. The ratio of the two velocity values, i.e., the reference velocity value and the velocity value calculated on the basis of the displacement amounts, can now be calculated. Since there is also the same ratio in other regions and surface portions, the actual velocity for the respective other region or for the respective other surface portion can be inferred from the velocity calculated on the basis of the above-mentioned displacement amounts for the respective other region or for the respective other surface portion.

Accordingly, the image processing unit can be configured to detect a crop pickup device 7, particularly a reel, of the header 2 as a component C by means of the method of velocity characteristic map determination and/or by means of the method of line detection and, by making use of its actual (known) rate of rotation and comparing this rate of rotation with the velocity calculated (based on the displacement amounts) for the surface portion of the machine part of component C, to determine a reference velocity.

The driving speed, which is likewise known, can also be used instead of the rate of rotation of the reel, for example. Therefore, there is also a value fixed for the velocity of the field stand 5 relative to the crop collection arrangement 2. Since the field stand 5 is detected in regions A, B, there is also a value fixed for the velocity in these regions A, B in the plane of the generated images 14. This velocity or this velocity value also forms a reference velocity or a reference velocity value.

Accordingly, the image processing unit can be configured to detect a region A with the field stand 5 in front of the header 2 or a region B with the field stand 5 behind the header 2 by means of the method of velocity characteristic map determination and/or by means of the method of line detection and to determine a reference velocity by making use of the actual (known) driving speed of the agricultural work machine 1 and by comparing this driving speed with the velocity which is calculated (based on the displacement amounts) for the field stand 5 of the respective region A, B.

In particular, the image processing unit 13 is configured to calculate the actual velocity of the crop 4 or field stand 5 in region A, B, D, H or the actual velocity of the component C, D, E, F in that a velocity in a region A, B, D, H or in a component C, D, E, F, which velocity is determined by means of the method of velocity characteristic map determination and/or by means of the method of line detection, is compared with the reference velocity.

Accordingly, by means of comparing a region A, B, G, H with one or more reference regions or one or more reference surface portions, the image processing unit 13 can determine the produce flow velocity in this region. Correspondingly, by comparing a surface portion of a machine part of a component C, D, E, F with one or more reference regions or one or more reference surface portions, the image processing unit 13 can also determine the velocity of the component C, D, E, F having this surface portion.

REFERENCE CHARACTERS 1 agricultural work machine
2 header, in particular crop collection arrangement
3 cutting unit
4 crop
5 field stand
6 further work elements
7 crop pickup device
8 crop cutting device
9 crop conveying device
10 crop intake device
11 control device
12 sensor unit
13 image processing unit
14 image
14*a-h* image areas
15 data output unit
15*a* display device
A-H detected regions and components

What is claimed is:

1. An agricultural work machine, comprising: a header for performing agricultural work, and a control device which has at least one sensor unit configured for detecting a crop stream in and/or around the header and an image processing unit for processing images which are generated by the sensor unit based on the crop stream detected via the sensor, wherein the control device is configured to detect regions (A, B, G, H) of like characteristics, components (C, D, E, F) of the header and properties of the crop stream, and is configured to use that which has been detected for open loop control and/or closed loop control of process sequences in the agricultural work machine, wherein the image processing unit is configured to apply a method of velocity characteristic map determination and/or to use a method of line detection and/or to use at least one color filter for determining the regions (A, B, G, H) and/or components (C, D, E, F) and/or properties of the crop stream based on the images generated by the sensor unit, and wherein the image processing unit is configured to carry out an object detection by the method of velocity characteristic map determination and/or the method of line detection, accompanied by the use of at least one color filter, so that the object detection comprises distinguishing between biomass and mechanical objects, and/or wherein the object detection comprises distinguishing one or more regions (A, B, G, H) and one or more surface portions of machine parts of the components (C, D, E, F).

2. The agricultural work machine according to claim 1, wherein the image processing unit is configured to determine as the region (A) a field stand in front of the header and to identify it as a field stand in front of the header, and/or to determine as the region (B) the field stand behind the header and to identify it as a field stand behind the header, and/or to determine as the component (C) a crop pickup device (of the header and to identify it as a crop pickup device, and/or to determine as the component (D) a crop cutting device of the header and to identify it as crop cutting device, and/or to determine as the component (E) a crop conveying device of the header and to identify it particularly as crop conveying device, and/or to determine as the component (F) a crop intake device of the header and to identify it as a crop intake device, to determine as the region (G) the crop stream inside of the crop pickup device and to identify it as a crop stream inside of the crop pickup device, and/or to determine as the region (H) the crop stream vertically above the crop cutting device of the header, and to identify it particularly as crop stream vertically above the crop cutting device.

3. The agricultural work machine according to claim 2, wherein in order to identify a respective determined region (A, B, G, H) or a respective determined component (C, D, E, F), the image processing unit is configured to compare identification data which are associated with the respective region (A, B, G, H) or with the respective component (C, D, E, F) and which characterize the respective component and which are stored in the image processing unit.

4. The agricultural work machine according to claim 1, wherein the image processing unit is configured to generate a velocity characteristic map which has produce flow velocities and/or velocities of surface portions of machine parts of the components of the header with the method of velocity characteristic map determination based on the images generated by the sensor unit.

5. The agricultural work machine according to claim 1, wherein for producing the velocity characteristic map, the image processing unit is configured to group two consecutive images of an image sequence generated by the sensor unit to form an image pair, wherein a time interval between the images of the respective image pair is detected and/or predetermined by the image processing unit, and wherein each image of the respective image pair has an intensity pattern.

6. The agricultural work machine according to claim 5, wherein for producing the velocity characteristic map, the image processing unit is configured to determine positional displacements of the intensity patterns between the images of the respective image pair, wherein the positional displacements comprise displacement amounts and displacement directions of the intensity patterns, so that the displacement amounts and displacement directions for each image pair are combined as vectors of a vector field of the respective image pair.

7. The agricultural work machine according to claim 6, wherein the image processing unit is configured to calculate velocities from the displacement amounts of the intensity patterns between the images of the respective image pair and the time interval between the images of the respective image pair, so that the velocities are the produce flow velocities of the crop stream and/or the velocities of the surface portions of the machine parts of the components of the header.

8. The agricultural work machine according to claim 1, wherein the image processing unit is configured to generate an edge image initially for the respective image in the method of line detection based on the images generated by the sensor unit and to determine straight lines in the edge image based on the respective edge image.

9. The agricultural work machine according to claim 8, wherein the image processing unit is configured to group two consecutive images of an image sequence generated by the sensor unit to form an image pair with the method of line detection, wherein a time interval between the images of the respective image pair is detected and/or predetermined by the image processing unit, and wherein each image of the respective image pair has a line pattern comprising one or more straight lines.

10. The agricultural work machine according to claim 9, wherein the image processing unit is configured to determine positional displacements of the line patterns between the images of the respective image pair with the method of line detection, wherein the positional displacements comprise displacement amounts.

11. The agricultural work machine according to claim 10, wherein the image processing unit is configured to calculate velocities from the displacement amounts of the line patterns between the images of the respective image pair and a time interval between the images of the respective image pair, wherein the velocities are velocities of surface portions of the machine parts of the components of the header, and/or wherein a velocity is the velocity of a surface portion of a machine part of the crop pickup device.

12. The agricultural work machine according to claim 1, wherein the image processing unit is configured to predetermine one or more regions as a reference region, and/or wherein the image processing unit is configured to predetermine one or more surface portions of machine parts of the components as a reference surface portion.

13. The agricultural work machine according to claim 12, wherein the image processing unit is configured to use one or more reference regions and/or one or more reference surface portions as basis for a comparison with another region, and/or wherein the image processing unit is configured to use one or more reference regions and/or one or more reference surface portions as basis for a comparison with another surface portion of a machine part of a component.

14. The agricultural work machine according to claim 12, wherein the image processing unit is configured to determine produce flow velocity in a region by comparing the region with one or more reference regions or with one or more reference surface portions, and/or the image processing unit is configured, by comparing a surface portion of a machine part of a component with one or more reference regions or one or more reference surface portions, to determine the velocity of the components having this surface portion.

15. The agricultural work machine according to claim 1, wherein the image processing unit is configured to detect a crop pickup device of the header as a component by means of the method of velocity characteristic map determination and/or by the method of line detection and to determine a reference velocity by making use of an actual rate of rotation of the crop pickup device and by comparing this rate of rotation with the calculated velocity for the surface portion of the machine part of the component.

16. The agricultural work machine according to claim 15, wherein the image processing unit is configured to calculate the actual velocity of the crop or field stand in a region or the actual velocity of a component in that a velocity determined in the region or in the component by the method of velocity characteristic map determination and/or by the method of line detection is compared with the reference velocity.

17. The agricultural work machine according to claim 1, wherein the image processing unit is configured to detect a region with a field stand in front of the header or a region with a field stand behind the header by the method of velocity characteristic map determination and/or by means of the method of line detection and to determine a reference velocity by making use of the actual driving speed of the agricultural work machine and by comparing this driving speed with the calculated velocity for the field stand of the respective region.

18. The agricultural work machine according to claim 1, wherein the header is a crop collection arrangement for cutting and gathering crop from a field stand and has, as components, a crop pickup device, a crop cutting device downstream thereof, a crop conveying device downstream thereof and a crop intake device downstream thereof.

19. The agricultural work machine according to claim 1, wherein a velocity of a surface portion of a machine part of the respective component is determined based on a marker, wherein the marker then forms the surface portion that is detected via sensor for determining the velocity of the surface portion of this component.

20. Agricultural work machine according to claim 1, wherein the sensor unit has at least one optical sensor in the form of at least one camera and/or at least one Lidar sensor, radar sensor and/or ultrasound sensor for detecting the crop stream and/or the header via sensor.

21. A method for the operation of an agricultural work machine having a header for performing agricultural work and having a control device which has at least one sensor unit for detecting a crop stream in and/or around the header and an image processing unit for processing images which are generated by the sensor unit based on the crop stream detected via sensor, comprising detecting with the control device regions (A, B, G, H) of like characteristics, components (C, D, E, F) of the header and properties of the crop stream and, on the basis thereof, controlling process sequences in the agricultural work machine by open loop controlling and/or closed loop controlling, wherein the image processing unit uses a method of velocity characteristic map determination and/or uses a method of line detection and/or uses at least one color filter for determining the regions (A, B, G, H) and/or components (C, D, E, F) and/or properties of the crop stream based on the images generated by the sensor unit, and further comprising the step of object detection by the image processing unit, by using the method of velocity characteristic map determination and/or using the method of line detection, accompanied by using at least one color filter, so that the object detection comprises distinguishing between biomass and mechanical objects, and/or wherein the object detection comprises distinguishing one or more regions (A, B, G, H) and one or more surface portions of machine parts of the components (C, D, E, F).

\* \* \* \* \*